United States Patent
Gubbens et al.

(10) Patent No.: US 7,612,348 B1
(45) Date of Patent: Nov. 3, 2009

(54) TRANSVERSE MAGNETIC FIELD VOLTAGE ISOLATOR

(75) Inventors: Alexander Jozef Gubbens, Redwood City, CA (US); Niles Kenneth MacDonald, San Jose, CA (US); Mehran Nasser-Ghodsi, Hamilton, MA (US); Rudy Flores Garcia, Union City, CA (US); Doug Keith Masnaghetti, San Jose, CA (US)

(73) Assignee: KLA-Technologies Corporation, Milpitas, CA (US)

( * ) Notice: Subject to any disclaimer, the term of this patent is extended or adjusted under 35 U.S.C. 154(b) by 0 days.

(21) Appl. No.: 12/125,863

(22) Filed: May 22, 2008

Related U.S. Application Data

(62) Division of application No. 10/882,663, filed on Jun. 30, 2004, now Pat. No. 7,394,339.

(51) Int. Cl.
*H01J 37/18* (2006.01)
*H01F 7/02* (2006.01)

(52) U.S. Cl. .................. 250/441.11; 156/345.29; 335/210; 335/306

(58) Field of Classification Search ............ 156/345.29; 250/441.11; 335/210, 306
See application file for complete search history.

(56) References Cited

U.S. PATENT DOCUMENTS

| | | |
|---|---|---|
| 3,600,065 A | 8/1971 | Law et al. |
| 4,117,323 A | 9/1978 | Greer et al. |
| 4,524,261 A | 6/1985 | Petric et al. |
| 4,528,451 A | 7/1985 | Petric et al. |
| 4,584,479 A | 4/1986 | Lamattina et al. |
| 4,607,167 A | 8/1986 | Petric |
| 4,818,838 A | 4/1989 | Young et al. |
| 4,837,443 A | 6/1989 | Young et al. |
| 4,956,024 A | 9/1990 | Dean et al. |
| 5,103,102 A | 4/1992 | Economou et al. |
| 5,584,994 A | 12/1996 | Hattori et al. |
| 5,928,426 A | 7/1999 | Aitchison |
| 6,030,486 A | 2/2000 | Loewenhardt et al. |
| 6,206,971 B1 | 3/2001 | Umotoy et al. |
| 6,214,161 B1 | 4/2001 | Becker et al. |
| 6,471,822 B1 | 10/2002 | Yin et al. |
| 6,571,821 B2 | 6/2003 | Matte et al. |
| 6,710,354 B1 | 3/2004 | Koch et al. |
| 6,716,346 B1 | 4/2004 | Chang |
| 6,746,566 B1 * | 6/2004 | Olson et al. ............ 156/345.29 |
| 7,288,774 B1 * | 10/2007 | Koch et al. ............ 250/441.11 |

(Continued)

*Primary Examiner*—Nikita Wells
(74) *Attorney, Agent, or Firm*—Suiter Swantz pc llo

(57) ABSTRACT

A voltage-isolating passageway for providing high voltage isolation between a component maintained at high DC voltage and a component maintained at a substantially lower voltage is described. The voltage-isolating passageway incorporates a transverse magnetic field across its passageway, which reduces the potential energy of charged particles (e.g., electrons) passing through the passageway. The voltage-isolating passageway includes a passageway and at least two magnets. The passageway has two openings and the two magnets are positioned along opposite and exterior surfaces of the passageway wherein the first and second magnets impose a magnetic field in a transverse direction with respect to a lengthwise axis of the passageway. In one embodiment, each of the passageways have small diameters and transfer gases at small flow rates. A support structure secures the passageways and magnets in position relative to each other and a magnetic shield encases the components to prevent the magnetic field from affecting external components.

13 Claims, 5 Drawing Sheets

U.S. PATENT DOCUMENTS 7,321,125 B1 1/2008 Olson et al.
7,394,339 B1 * 7/2008 Gubbens et al. ............. 335/306

2001/0032591 A1 10/2001 Carducci et al.
2002/0185067 A1 12/2002 Upham

* cited by examiner

Section D-D

TRANSVERSE MAGNETIC FIELD VOLTAGE ISOLATOR

CROSS-REFERENCE TO RELATED APPLICATIONS

This application is a division of prior U.S. patent application Ser. No. 10/882,663, filed Jun. 30, 2004, entitled "Transverse Magnetic Field Voltage Isolator," which is incorporated herein by reference in its entirety for all purposes. This application is related to U.S. Pat. No. 6,746,566, entitled "Transverse Magnetic Field Voltage Isolator," U.S. Pat. No. 7,321,125, entitled "Transverse Magnetic Field Voltage Isolator," and to U.S. Pat. No. 6,710,354, entitled "Scanning Electron Microscope Architecture and Related Material Handling System," the contents of each of which are hereby incorporated by reference.

FIELD OF THE INVENTION

The present invention relates generally to voltage isolation, and more specifically to magnetic voltage isolation techniques.

BACKGROUND OF THE INVENTION

Avalanche ionization is a physical phenomenon that significantly decreases the operating voltage range of various low-pressure systems. Avalanche ionization typically occurs in low-pressure, gas-filled environments when high potential electrons collide into and break apart molecules into atoms and additional high potential electrons. The additional high potential electrons, in turn, take part in a chain reaction in which more and more molecules are broken apart. This chain reaction causes the gas to change into highly conductive plasma.

Avalanche ionization is problematic, for example, in low-pressure applications (e.g., less than 10 Torr) in which a component that is maintained at a high voltage is separated from another component, which is maintained at ground potential, by a gas-filled passageway. When avalanche ionization occurs within the gas-filled chamber, the created plasma forms an electrical pathway between the separated components, which drains the voltage from the high-voltage component. The plasma effectively short circuits the components and prevents high-voltage operation.

Exemplary applications of low-pressure applications include semiconductor fabrication systems, electron microscopes, and space-based ion propulsion systems. In semiconductor fabrication systems, the wafer and the chuck holding the wafer are maintained at very high voltages, typically in the range of thousands of volts, and a connected vacuum pump is at ground potential. In electron microscopes, the microscope is maintained at a high voltage and a connected vacuum pump is at ground potential. In the case of an ion engine, an ion source, typically maintained at a high voltage, is connected to a gas-feed system at ground potential. In each type of system, it is desirable to prevent avalanche conditions by increasing the threshold voltage at which plasma ionization occurs.

Currently, approaches for preventing avalanche ionization have been implemented. However, these techniques have certain drawbacks that leave the industry wanting for a more superior method. For instance, one current technique involves separating the high voltage source and the nearest ground by a large distance. This technique is impractical, however, because the necessary distances are typically infeasible in light of physical space limitations. Another technique involves separating the high voltage component and the grounded component by forming part of the gas chamber that connects the components with an electrically insulating material. Unfortunately, this technique is simply not very effective in reducing the breakdown threshold voltage. Yet another technique involves placing a porous dielectric material in the line between the high voltage component and the grounded component to obstruct the path in which high potential electrons can travel. The dielectric material reduces the potential of the electrons, however, it also significantly impedes the flow of gas. In the case where the bias is of an A/C nature, a faraday cup has been used with limited success.

In view of the foregoing, techniques for effectively increasing the voltage level at which avalanche ionization occurs in low-pressure applications would be desirable.

BRIEF SUMMARY OF THE INVENTION

The present invention is directed to techniques for increasing the voltage level at which avalanche ionization occurs in low-pressure applications. The invention essentially creates a transverse magnetic field across a gas passageway, which reduces the potential energy of charged particles (e.g., electrons) passing through the passageway. The reduction in electron potential energy reduces the energy of collisions between electrons and molecules and therefore reduces the likelihood of avalanche ionization.

One aspect of the invention pertains to a voltage-isolating apparatus that includes at least two passageways and a first and a second magnet. Each passageway has two openings wherein each opening is configured to be connected to external components and is capable of being sealed such that a low-pressure environment can be sustained within each passageway. Each passageway also transfers gas as a relatively low flow rate. The first and the second magnet are positioned along opposite and exterior surfaces of each of the passageways wherein the first and second magnets impose a magnetic field in a transverse direction with respect to a lengthwise axis of each of the passageways. The transverse magnetic field reduces the potential energy of charged particles traveling through each of the passageways. In one embodiment, the flow rate for transferring gas through each of the passageways is approximately in the range of 0.5-10 sccm. In another embodiment, the outer diameter of each passageway is approximately in the range of 0.0625-0.25 inches. In yet another embodiment, the apparatus further includes a support structure that secures each of the passageways and each of the magnets in position with respect to each other. In yet another embodiment, the apparatus also includes a magnetic shield configured to enclose the support structure, each of the passageways, and each of the magnets, wherein the magnetic shield contains the magnetic field and thereby prevents exposure of external devices to the magnetic field.

Another aspect of the present invention pertains to a high voltage system having at least two components that are each maintained at different voltage biases. The system includes a vacuum chamber, a vacuum pump, and at least two voltage-isolating passageways, and a first and a second magnet. The vacuum chamber is maintained at a very high DC electrical potential and the vacuum pump is maintained at a potential that is lower than the potential at which the vacuum chamber is maintained. The two voltage-isolating passageways are each connected to the vacuum chamber and the vacuum pump and include two openings wherein each opening has vacuum fitting seals. One of the openings of each passageway is configured to be connected to the vacuum chamber and the other opening configured to be connected to the vacuum pump such that a vacuum can be sustained within each passageway. Each passageway also transfers gas as a relatively low flow rate. The first and second magnet are positioned along opposite and exterior surfaces of the passageways wherein the first and second magnets impose a magnetic field in a transverse direction with respect to a lengthwise axis of each passageway.

Another aspect of the present invention pertains to a method that involves at least guiding a gas along at least two pathways such that the gas flows from a first external component to a second external component at a relatively low flow rate and directing a magnetic field through each of the pathways in a transverse direction with respect to a lengthwise axis of each of the pathways in order to reduce the potential energy of charged particles within the gas as the gas travels through each of the pathways.

These and other features and advantages of the present invention will be presented in more detail in the following specification of the invention and the accompanying figures, which illustrate by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known operations have not been described in detail so not to unnecessarily obscure the present invention.

The present invention pertains to techniques for increasing the breakdown threshold voltage at which avalanche ionization can occur within low-pressure environments. One specific implementation of the invention involves providing high voltage isolation between a vacuum chamber and a vacuum pump in pressure range of approximately 1 mill-Torr-1 Torr with little or no current load on the voltage source and without impeding the flow of gas from a vacuum chamber to a vacuum pump. The invention creates a transverse magnetic field across a gas passageway, which reduces the potential energy of charged particles (e.g., electrons) passing through the passageway. The reduction in electron potential energy reduces the energy of collisions between electrons and molecules and therefore the likelihood of avalanche ionization. For descriptions of implementations using the voltage-isolation system of the present invention, see U.S. patent application Ser. No. 10/052,307, entitled "Scanning Electron Microscope Architecture and Related Material Handling System."

Figure 1:
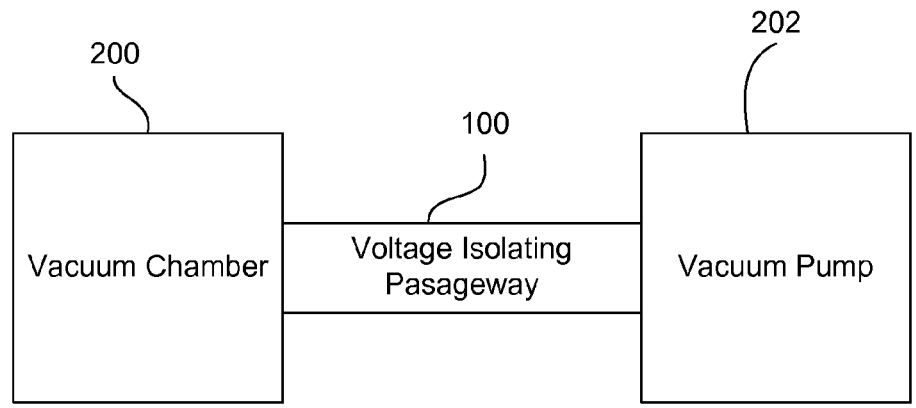
FIG. 1 illustrates a block diagram showing the basic concept wherein voltage-isolation passageway system connects two components.

FIG. 1 illustrates a block diagram showing the basic arrangement in which a voltage-isolating passageway system 100 of the present invention can be utilized. In FIG. 1, passageway system 100 connects two components 200 and 202. In a specific embodiment, component 200 is a vacuum chamber and component 202 is a vacuum pump that pumps down the pressure of vacuum chamber 200 through passageway system 100. Various devices can operate within vacuum chamber 200. For example, a scanning electron microscope or a semiconductor-manufacturing device can operate within vacuum chamber 200. Typically, the device within vacuum chamber 200 is biased at a very high voltage while vacuum pump 202 is grounded at substantially 0 Volts. For example, a typical electron microscope may operate at −5000 Volts. Voltage-isolating system 100 acts to substantially prevent current flow between components 200 and 202 so that the components do not short-circuit each other.

Figure 2:
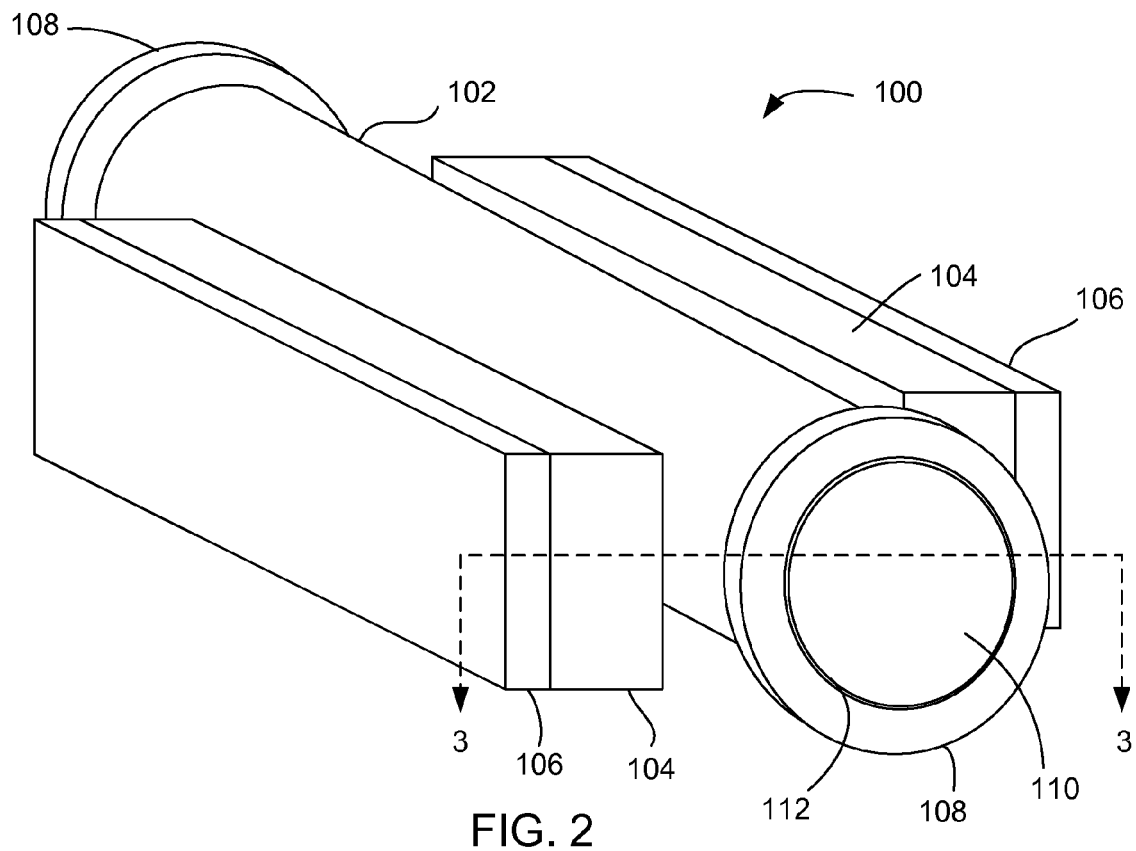
FIG. 2 illustrates a perspective view of a voltage-isolating passageway system according to one embodiment of the present invention.
Figure 3:
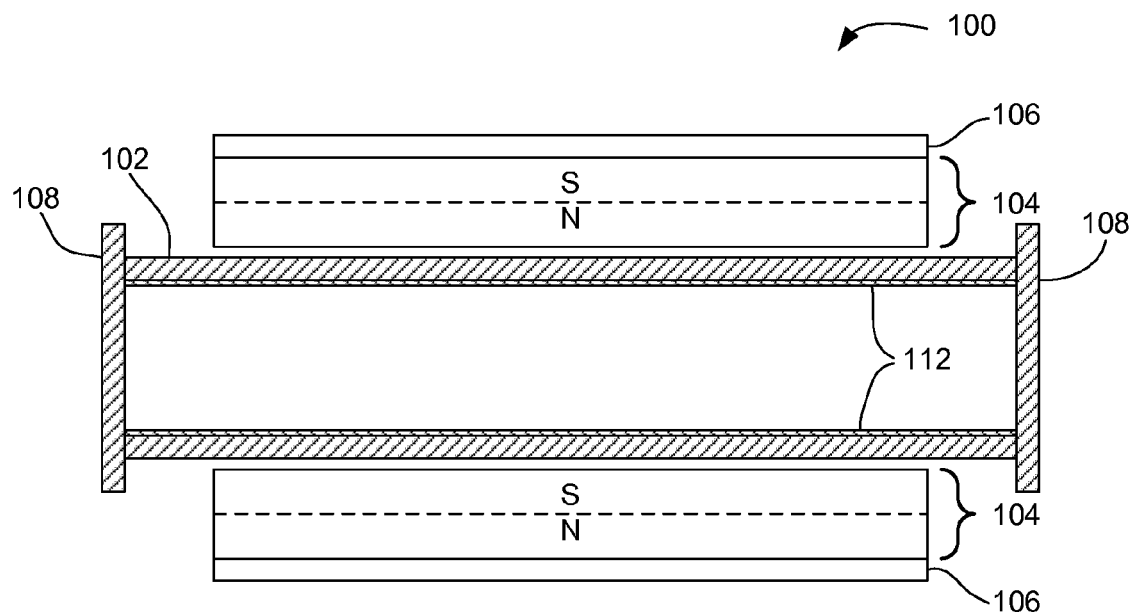
FIG. 3 illustrates a cross-sectional view of system along line 3-3 in FIG. 2.

FIG. 2 illustrates a perspective view of voltage-isolating passageway system 100 of FIG. 1, according to one embodiment of the present invention. FIG. 3 illustrates a cross-sectional view of system 100 along line 3-3 in FIG. 2. Passageway system 100 includes a passageway 102 and two magnets 104 positioned about the outer walls of passageway 102. Passageway 102 has a seal 108 at each opening 110. Pole pieces 106 are attached to the outside surfaces of magnets 104. The inner surface of passageway 102 is coated with a semi-conductive coating 112.

Passageway 102 is a tube through which gas can travel. Seals 108 help maintain the vacuum created within the chambers connected by passageway 102. Seals 108 can be, for example, O-ring seals. Passageway 102 can be of a variety of shapes even though, for exemplary purposes, passageway 102 is shown to have a tubular configuration. Passageway 102 is preferably made of electrically non-conductive materials such as polycarbonate materials.

As seen in FIG. 3, magnets 104 are bar magnets that are oriented so that their poles face the same direction. In this orientation, opposite poles of each magnet 104 face each other and across passageway 102. The north and south poles that face each other across passageway 102 create a magnetic field in the direction transverse to the length of passageway 102. As will be describe in more detail below, the transverse magnetic field will reduce the potential energy of free electrons moving through passageway 102 since it applies a force that is orthogonal to the electron's direction of movement. Magnets 104 can be a single bar magnet having a length equal to a substantial length of passageway 102 as shown in FIG. 3, or each magnet 104 can be substituted with a plurality of individual smaller magnets. Of course, when individual magnets are used, their poles must still be oriented so that opposite poles face each other across passageway 102. Magnets 104 are permanent magnets, however, electrically powered magnets could also be used. Magnets 104 can be made of rare earth materials. In general, the length and strength of the magnetic field dictate the amount of voltage isolation that can be achieved. Longer fields and stronger magnets both produce higher levels of voltage isolation. For particular applications that require less voltage isolation, shorter magnets can be used. For the application of an electron microscope, magnets 104 create a transverse magnetic field of at least 2250 Gauss. Magnetic fields stronger than 2250 Gauss can provide higher levels of voltage isolation, thereby allowing isolated components to operate at voltages greater than 7000 Volts DC.

Pole pieces 106 are attached to the outer surface of magnets 104 in order to direct the magnetic field direction in the transverse direction with respect to the length of passageway 102. Pole pieces can be formed of iron or other suitable materials and alloys.

Semi-conductive coating 112 has a very high resistance that keeps any current flow between each end of passageway 102 to a minimum. Coating 112 gives passageway 102 an end-to-end nominal resistance of approximately 115 Mega Ohms. This corresponds to a nominal surface resistance of 60 Mega Ohms square. Preferably, coating 112 is a mixed metal oxide in an acrylic polymer carrier. The acrylic polymer carrier prevents evaporation and contamination of coating 112. The end-to-end resistance of passageway 102 can vary depending upon the characteristics of coating 112. For instance, the use of various materials can affect the resistance of coating 112. Semi-conductor coating 112 can be applied to the inner surface of passageway 102 by spray application techniques.

In an embodiment of system 100 in which passageway 102 is used to connect a vacuum chamber and a vacuum pump, passageway 102 is a polycarbonate tube that is approximately six inches long, having an outer diameter of 1.25 inches, and having a wall thickness of 1/8 inches. The magnets 104 that are mounted to passageway 102 are 12 individual magnet pieces, that are 1"×1"×0.5" in dimension, 35 grade, and formed of neodymium rare earth magnets. Each of the 12 magnets are arranged into two bar magnets wherein each of the bars are placed on one side of passageway 102. Each of the bars are created by attaching six magnets to a 6"×1"×3/8" piece of C1018 cold-rolled piece of steel. This embodiment of voltage isolation system 100 can effectively increase the threshold breakdown voltage, at any pressure, thereby allowing a high voltage system to operate at higher voltages.

Figure 4:
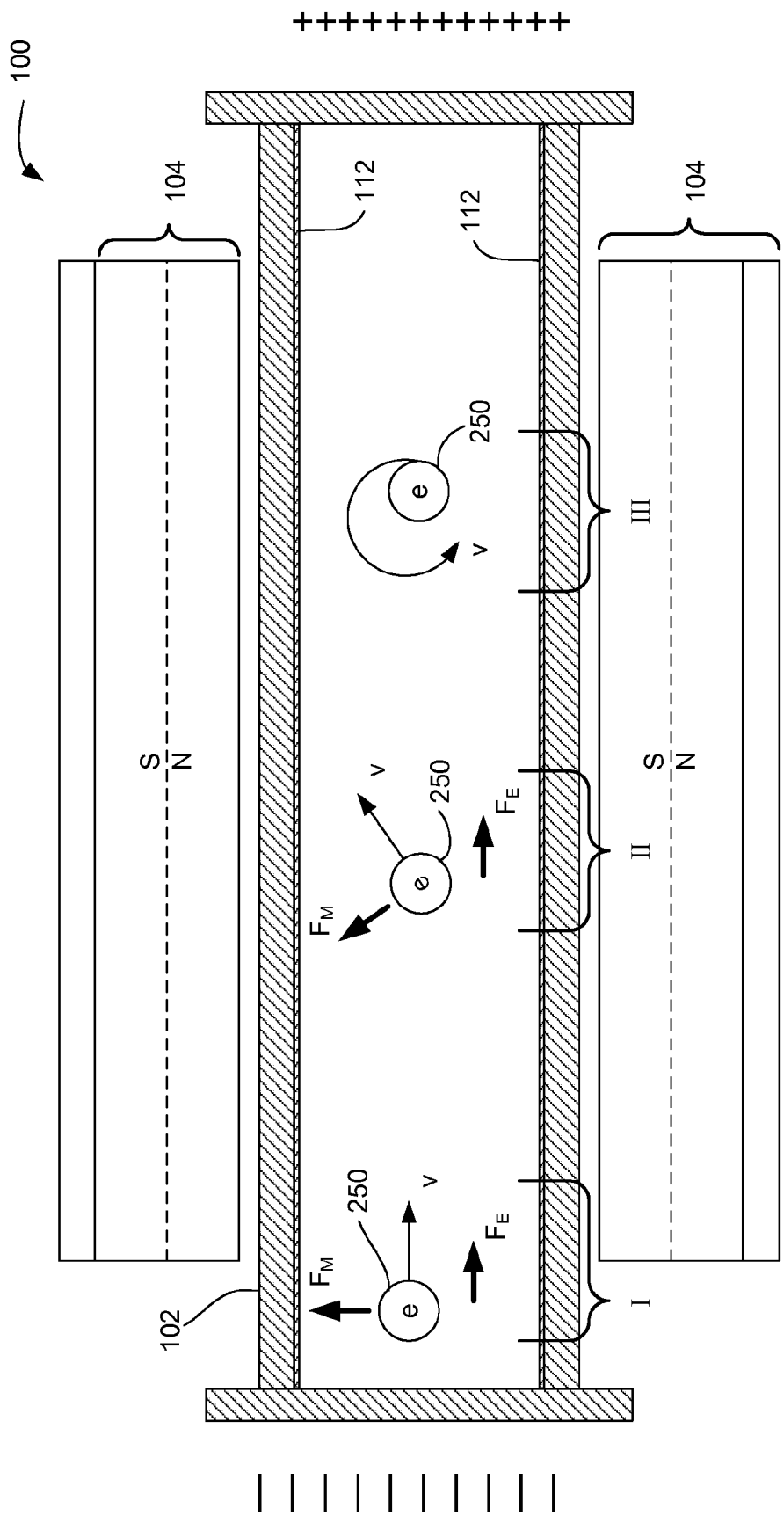
FIG. 4 presents an enlarged cross-sectional view of voltage-isolating passageway system to describe how the transverse magnetic field reduces the potential energy of the charged particles that pass through the passageway.

FIG. 4 presents an enlarged cross-sectional view of voltage-isolating passageway system 100 to describe how the transverse magnetic field reduces the potential energy of the charged particles that pass through the passageway. FIG. 4 represents a passageway system 100 wherein the left side is connected to a component that is maintained at a high negative DC voltage and the right side is connected to a component that is maintained at a ground potential. For example, the left side is connected to an electron microscope and the right side is connected to a vacuum pump. The negative and positive signs on each side of passageway 102 represent the negative and ground potentials. Both the suction of the pump and the electrical force, FE, caused by the electrical bias across the passageway 102, accelerate free electrons along the longitudinal axis and from the left to the right end of passageway 102. These forces cause electrons to travel at very high speeds, and therefore, to have very high potential energies. Again, avalanche ionization is caused when these electrons begin to collide and break apart molecules, thereby creating more high-energy electrons that will break apart additional molecules.

A single electron 250, progressing through three basic stages (I, II, and III), is shown within passageway 102 to describe how the transverse magnetic field, FM, reduces the potential energy of the traveling electrons. Stage I, represents the initial stage in which electron 250 enters passageway 102 and is accelerated towards the right end of passageway 102 such that it has a velocity, v. Upon entering passageway 102, electron 250 has a velocity, v that is substantially in the direction of the passageway's longitudinal axis. However, as shown in stage II, as electron 250 enters into the transverse magnetic field created by magnets 104, the force of the magnetic field, represented by FM, accelerates electron 250 in a direction orthogonal to velocity, v. FM represents the direction of the magnetic field. Since, the magnetic force on an electron remains orthogonal to the direction of the moving electron, magnetic force FM causes electron 250 to move in a cyclical path while traveling through passageway 102. Stage III represents the cyclical path in which electron 250 travels, as caused by FM. While travelling in the cycloidic path, the electron is accelerated for one half of the cycle and decelerated for the other half, with respect to the longitudinal axis of passageway 102. As a result, the velocity of electron 250, and therefore its potential energy is greatly reduced. Collisions with the spinning electron 250 now occur at greatly reduced energy. This reduces the possibility that a collision between electron 250 and a molecule would result in the beginning of avalanche ionization.

Semi-conductive coating 112 also detracts from avalanche ionization conditions by absorbing electrons that make contact with the coating, thus reducing the amount of potential energy available. Note that the transverse magnetic force increases the number of electrons that will make contact with coating 112 by forcing electrons towards one side of the inner surface of passageway 102. Effectively, semi-conductive coating 112 reduces the total number of free electrons within the gas, thereby reducing the number electron/molecule collisions. Semi-conductive coating 112 provides a high impedance and direct current path for the absorbed electrons in which the electrons can be conducted toward the ground potential in a controlled and predictable manner. The impedance of coating 112 is sufficiently large that the flow of current through passageway 102 causes only a negligible drop in voltage between the components on either end of system 100.

Voltage-isolating system 100 is effective with or without semi-conductive coating 112. However, for significantly higher voltage isolation, it is preferable to utilize both the magnets 104 and the semi-conductive coating 112. In some embodiments, passageway 102 can be extruded with a conductive doping so that the need to coat the passageway with the semi-conductive coating is eliminated.

Depending upon the voltage isolation and pressure requirements of specific implementations, the length and shape of the passageway can be adjusted accordingly. Also, the field strength and the arrangement of the magnetic poles can be positioned to obtain different levels of voltage isolation.

The effectiveness of the voltage-isolation passageway system of the invention allows the passageway connecting a vacuum chamber and a vacuum pump to be relatively short in length and presents no significant impedance of the flow of the gas. This is particularly advantageous in conditions where space, for example, in a manufacturing plant, is at a premium.

Figure 5:
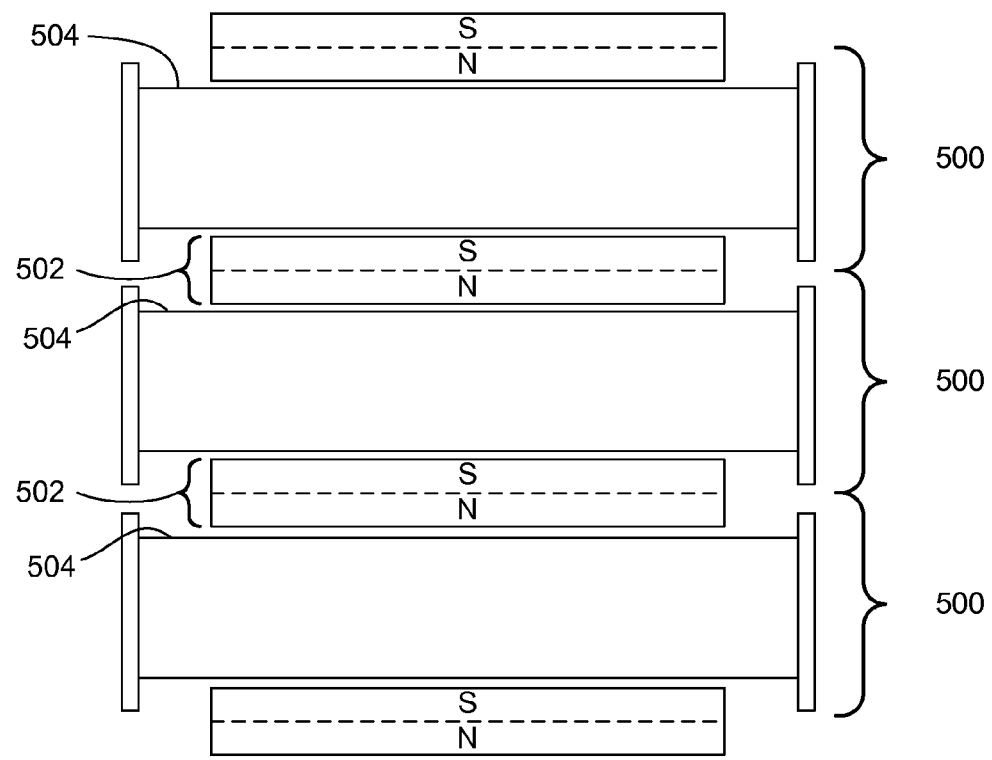
FIG. 5 illustrates an alternative embodiment of the present invention in which three voltage-isolation passageway systems are aligned in parallel.

FIG. 5 illustrates an alternative embodiment of the present invention in which three voltage-isolation passageway systems 500 are aligned in parallel. The arrangement in FIG. 5 is useful in systems in which different levels of low-pressure environments are maintained during the operation of a vacuum system. For instance, each passageway 504 can connect a respective vacuum pump to a respective vacuum chamber. In the parallel arrangement, the north and south poles of each magnet 502 are positioned to face adjacent passageways 504. With this arrangement, it is no longer necessary to have a pole piece for each magnet.

For description of an implementation using the voltage-isolation passageway system of the present invention, see U.S. patent application Ser. No. 10/052,307, entitled "Scanning Electron Microscope Architecture and Related Material Handling System."

Figure 6:
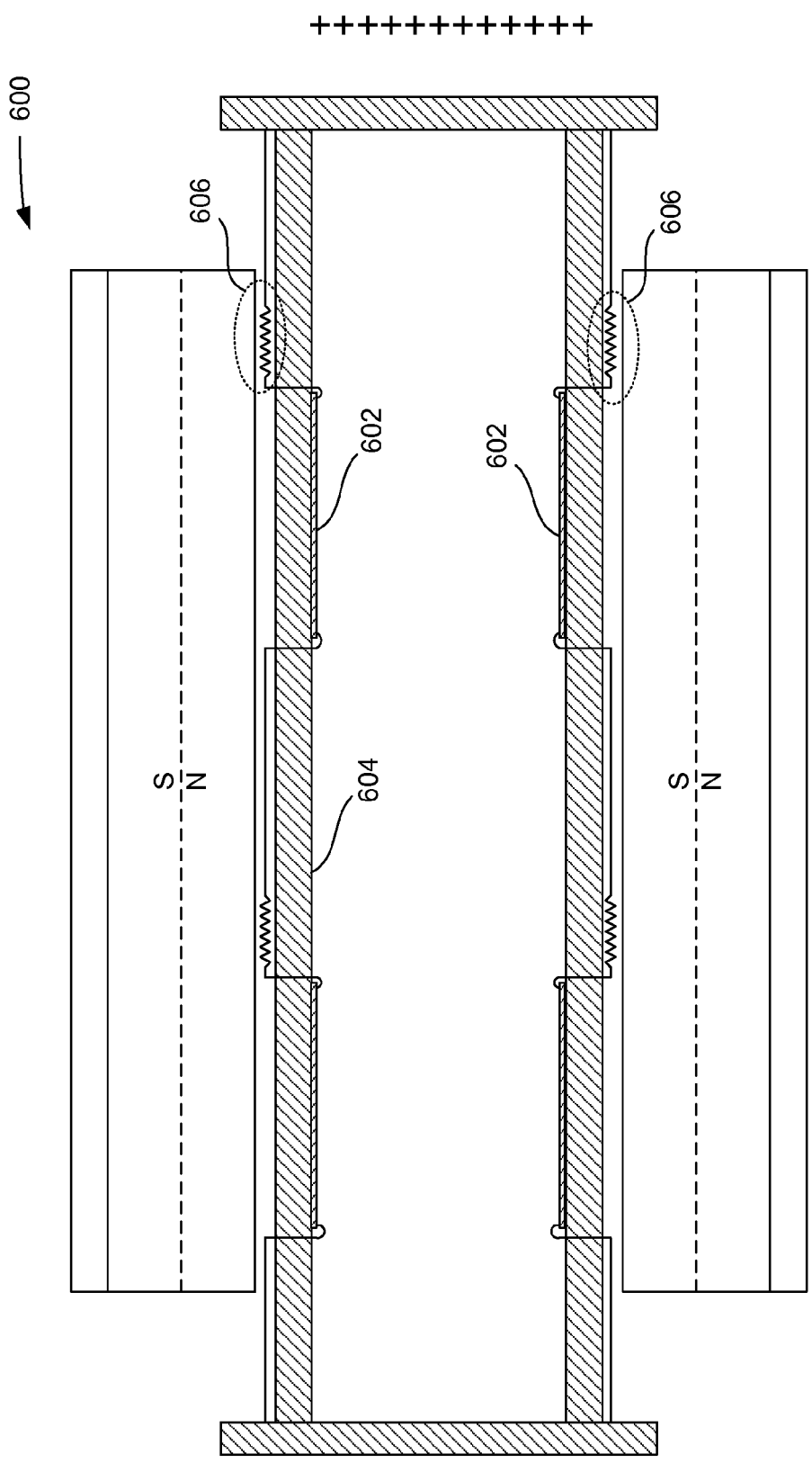
FIG. 6 illustrates a voltage isolation passageway system according to another alternative embodiment of the invention.

FIG. 6 illustrates a voltage isolation passageway system 600 according to another alternative embodiment of the invention. System 600 has a series circuit of discrete strips of semi-conductive coating 602 on the inner surface of passageway 604 that are connected to external resistors 606. The series circuitry connects the opposite ends of passageway 102 such that the voltage drop occurs in measured amounts along the length of passageway 102 as determined by resistors 606. As with the semi-conductive coating that covers the entire length of the passageway, the discrete strips of semi-conductive coating 602 also collect free electrons so to remove them from the flowing gas. In this configuration the bias potential can be actively monitored along the length of the pathway.

An alternative application of the invention utilizes a magnetic field to isolate selected regions of a substrate from plasma formed through avalanche ionization. This application relates to the industrial plastics industry, which uses plasma as a means to modify the surface of a substrate in order to enhance the bonding of an unlike and or incompatible material to their product, i.e. paint on plastic, Teflon coating on silicon rubber, etc. In some cases it is necessary to shield a portion of the whole substrate from the effects of the plasma chemistry. A magnetic field could be easily adapted to any shape and likewise and be positioned to prevent a plasma from being formed within its field, thus creating a plasma shadow zone to protect sensitive areas of the substrate from the surface modifications due to direct exposure to plasma. This process is typically achieved with masking material that is costly and labor intensive.

Figure 7B:
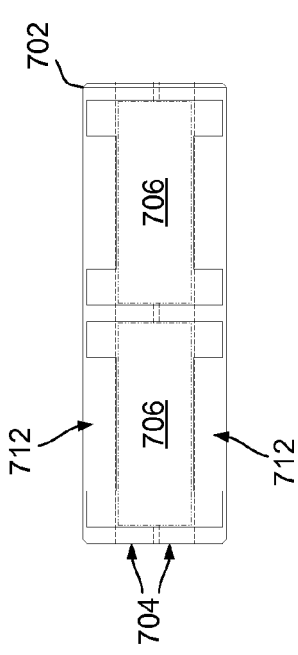
FIGS. 7A-D illustrate various view of a voltage isolation passageway system 700 according to another alternative embodiment of the present invention.
Figure 7C:
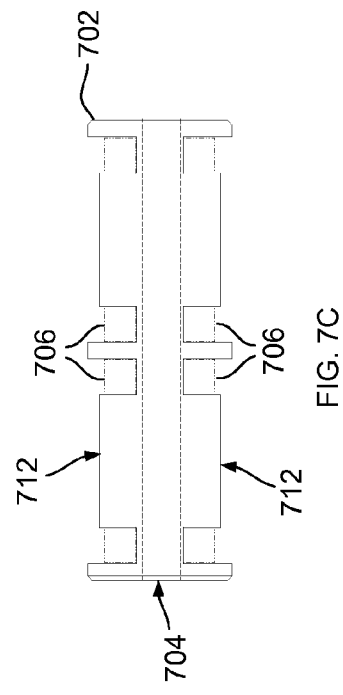
Figure 7D:
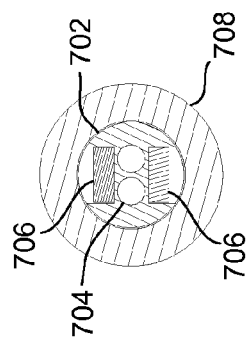
Figure 7A:
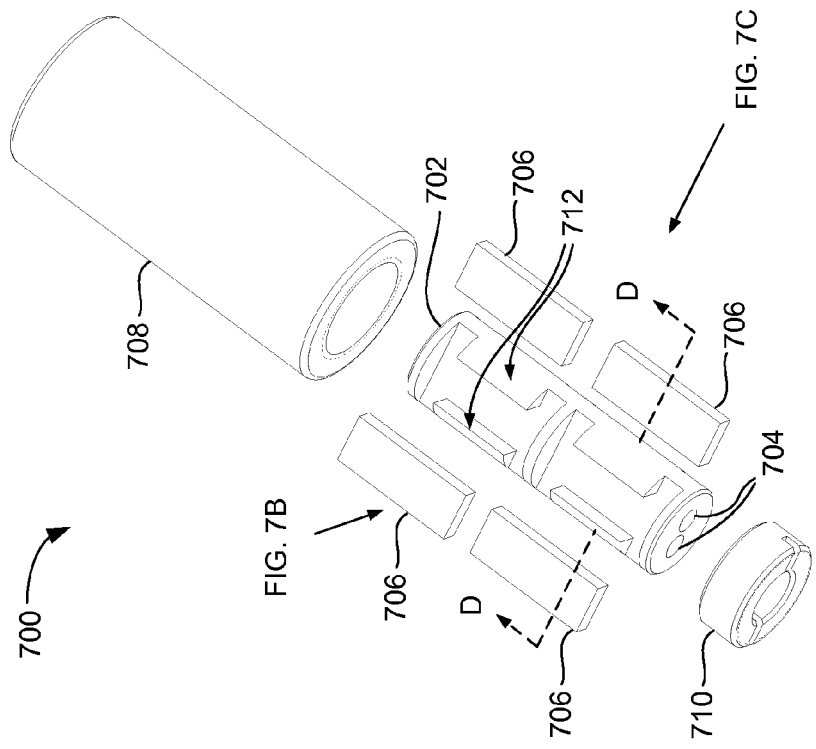

FIGS. 7A-D illustrate various views of a voltage isolation passageway system 700 according to another alternative embodiment of the present invention. FIG. 7A illustrates a perspective and unassembled view of system 700, FIG. 7B illustrates a top plan view of support structure 702, FIG. 7C illustrates a side plan view of support structure 702, and FIG. 7D illustrates a cross-sectional view of an assembled system 700 along line D-D, which is shown in FIG. 7A. The vantage points for the top plan and the side plan views of FIGS. 7B and 7C are represented by the directional lines shown in FIG. 7A. Note that FIGS. 7B and 7C illustrate only support structure 702. The uniformly dashed lines and the dotted-and-dashed lines 714 of FIGS. 7B and 7C represent passageways 704 as seen through the body of support structure 702 and phantom magnets 706, which show the position that magnets 706 would be in after placed onto support structure 702, respectively.

Voltage isolation passageway system 700 includes support structure 702, passageways 704, magnets 706, magnetic shield 708, and cap 710. Support structure 702 contains both of passageways 704 and supports each of the four magnets 706 around passageways 704. Magnetic shield 708 is a cylindrical shell that encases support structure 702, together with passageways 704 and magnets 706. Cap 710 fits into the open end of magnetic shield 708 in order to lock support structure 702 within magnetic shield 708.

Support structure 702 holds passageways 704 in position relative to each other and relative to magnets 706. In such an embodiment, support structure 702 and passageways 704 are distinct structural objects. However in an alternative embodiment, passageways 704 can be directly formed in the internal structure of support structure 702. For instance, passageways can be machined within a block of material used to form support structure 702. System 700 includes two passageways 704, however alternative embodiments can include more than two passageways 704. Multiple passageways 704 can be used to transfer different gases, which can also be at different pressures, though each passageway.

Passageways 704 can be sized according to various system design requirements. In some implementations, passageways 704 have relatively small diameters in the range of approximately ¼-1/16 of an inch (0.25-0.0625 inches). For instance, passageways 704 can have diameters of ¼, ⅛, or 1/16 of an inch. Note the diameter size typically refers to the outer diameter of passageways 704. The inner diameter of passageways 704 depends upon the thickness of the passageway walls as manufactured. The thickness of the walls is typically very thin, for example, approximately 0.02 inches.

The gases can be transferred at low pressures or at vacuum pressure. In some implementations, passageways 704 simply provide a channel through which to pull a vacuum pressure within a chamber. Gases can pass through each of passageways 704 at various flow rates. In one embodiment, gases pass through each of passageways at a relatively low flow rate. For example, the gases can flow through the passageways 704 at approximately 0.5-10 standard cubic centimeters (sccm).

The relatively small diameters of passageways 704 and/or the relatively small flow rates through passageways 704 can reduce the likelihood of avalanche ionization occurring. These factors lessen any need for a semi-conductive lining within each passageway 704 to assist in reducing the likelihood of avalanche ionization.

Support structure 702 positions two sets of magnets 706 around passageways 704. Each set of magnets 706 surrounds one half of the length of passageways 704. Each magnet 706 is secured onto support structure 702 by opposing braces 712. Opposing braces 712 secure the sides of each magnet 706.

Support structure 702 is formed of a non-magnetic material. In one embodiment, support structure 702 is formed of Teflon. Support structure 702 can have various shapes and sizes suitable for holding passageways 704 and magnets 706 in their fixed, relative orientations. For example, the size, shape, and number of braces 712 used to secure each of magnets 706 can vary. In one embodiment, support structure 702 has braces for supporting more than two pair of magnets 706. This can be appropriate when a larger number of magnets are required to create a magnetic field around a longer set of passageways 702.

As the length of passageways 704 increase, the strength of the magnetic field imposed by magnets 706 per length of passageways 704 can decrease while still effectively decreasing the energy of the gases passing through passageways 704 to prevent avalanche ionization. To impose a magnetic field over the entire length of passageways 704, two or more sets of magnet pairs can be positioned about passageways 704. Accordingly, magnets 704 that impose smaller magnetic forces can be used as the length of passageways 704 increases. In a similar, but opposite manner, as the length of the passageways 704 decreases, the strength of the magnetic field imposed by magnets 706 per length of passageways 704 should increase to provide the proper amount of energy reduction effect on the transferred gases. Note that magnets 706 are sufficiently wide to impose a magnetic field over the entire width of each of passageways 704. In one embodiment, magnets 706 are formed of neodymium-iron-boron (nd—fe—b).

In an alternative embodiment, additional pairs of magnets can be placed around passageways 704 in an orthogonal orientation with respect to magnets 706 shown in FIGS. 7A-D. In other words, if each pair of magnets 706 of FIGS. 7A-D said to be placed above and below passageways 704, the additional pair of magnets would surround the sides of passageways 704. In this embodiment, passageways 704 would have magnets surrounding their top, bottom, and side regions. Such an arrangement would create a magnetic field that would flow through passageways 704 and also would be contained within a smaller space. The additional side magnets are sometimes referred to as bucking magnets. Bucking magnets can be used to control the geometry of the magnetic circuit created by magnets 706 in order to reduce stray magnetic fields that would otherwise affect other devices.

Magnetic shield 708 is a cylindrical structure that surrounds support structure 702 and its respective magnets 706 and passageways 704. Shield 708 serves to contain the magnetic field of magnets 706 so that external devices and components are not adversely affected. For example, system 700 can be used within sensitive systems such as a semiconductor manufacturing system. Such a system may operate with less precision if influenced by a magnetic field. Shield 708 can be formed of various metals, for example, iron. Magnetic shield 708 is sometimes referred to as a shunt, which acts to shunt a magnetic field by containing the magnetic field within the shunt. Cap 710 is also a magnetic field shielding component, which is used to lock support structure within shield 708.

Note that specific embodiments of the voltage isolation passageway system 700 can use the additional side magnets and/or the magnetic shield 708 to contain the magnetic field and prevent it from affecting other devices. A magnetic shield 708 can be formed with a larger thickness to sufficiently contain a magnetic field when additional side magnets are not used.

In alternative embodiments, magnetic shield 708 can have various shapes, sizes, and thicknesses. Such form factors can be varied, for example, to accommodate physical integration of system 700 within another system, the strength of the magnetic field that is required to be contained, and the dimensions of support structure 702. For example, shield 708 can have a cylindrical shape as shown, or a rectangular, square, or a triangular shape. Note that the internal shape of shield 708 can vary to accommodate the shape of support structure 702.

One exemplary embodiment of system 700 has the following approximate dimensions: outer diameter of a round magnetic shield 708 is 0.9 inches; inner diameter of the magnetic shield 708 is ½ inch, the outer diameter of each passageway 704 is ⅛ inch.

While this invention has been described in terms of several preferred embodiments, there are alteration, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

We claim:

1. A voltage-isolating apparatus comprising:
   at least two passageways, each passageway having two openings wherein each opening is configured to be connected to a vacuum pump and a vacuum chamber and capable of being sealed such that a low pressure environment can be sustained within each passageway, each passageway being suitable for transferring gas at a relatively low flow rate, and each passageway is configured to be connected to the same vacuum pump and the same vacuum chamber; and
   a first and a second magnet positioned along opposite and exterior surfaces of each of the passageways wherein the first and second magnets impose a magnetic field in a transverse direction with respect to a lengthwise axis of each of the passageways, the transverse magnetic field tending to reduce the potential energy of charged particles traveling through each of the passageways.

2. A voltage-isolating apparatus as recited in claim 1 wherein the first and second magnets are oriented such that opposite poles face each other across the passageway.

3. A voltage-isolating apparatus as recited in claim 1 further comprising a fifth and a sixth magnet that are positioned along opposite and exterior surfaces of the passageways, wherein the first and second magnet are positioned at top and bottom regions of the voltage-isolating apparatus, respectively, and the fifth and sixth magnet are positioned at opposing side regions of the voltage-isolating apparatus.

4. A method for voltage isolation comprising:
   guiding a gas along at least two pathways such that the gas flows from a vacuum chamber to a vacuum pump at a relatively low flow rate, where each pathway is configured to be connected to the vacuum chamber and the vacuum pump; and
   directing a magnetic field through each of the pathways in a transverse direction with respect to a lengthwise axis of each of the pathways in order to reduce the potential energy of charged particles within the gas as the gas travels through each of the pathways.

5. A method as recited in claim 4 wherein the flow rate is approximately in the range of 0.5-10 sccm.

6. A method as recited in claim 4 further comprising:
   providing at least two continuous tubular structures that each define a respective one of the pathways.

7. A method as recited in claim 6 wherein the outer diameter of each tubular structure is approximately in the range of 0.0625-0.25 inches.

8. A method as recited in claim 6 wherein the operation of directing a magnetic field is performed by a first and a second magnet positioned along opposite and exterior surfaces of each of the continuous tubular structures.

9. A method as recited in claim 6 further comprising:
   configuring each of the continuous tubular structures to substantially run along side of each other.

10. A method as recited in claim 8 further comprising:
    securing each of the continuous tubular structures and each of the magnets in position with respect to each other using a support structure.

11. A method as recited in claim 10 further comprising:
    containing the magnetic field within a magnetic shield to prevent exposure of external devices to the magnetic field, the magnetic shield being configured to enclose the support structure, each of the continuous tubular structures, and each of the magnets.

12. A method as recited in claim 4 wherein the first external component is a gas-feed system.

13. A voltage-isolating apparatus comprising:
    at least two passageways, each passageway having two openings wherein each opening is configured to be connected to a vacuum pump and a vacuum chamber and capable of being sealed such that a low pressure environment can be sustained within each passageway, each passageway being suitable for transferring gas at a relatively low flow rate, and each passageway is configured to be connected to the same vacuum pump and the same vacuum chamber;

at least two magnets, where a first and a second magnet are positioned along opposite and exterior surfaces of each of the passageways wherein the first and second magnets impose a magnetic field in a transverse direction with respect to a lengthwise axis of each of the passageways, the transverse magnetic field tending to reduce the potential energy of charged particles traveling through each of the passageways;

a support structure configured for holding the at least two passageways in position relative to each other and relative to the first magnet and the second magnet;

a magnetic shield, the magnetic shield including a cylindrical structure configured to surround the support structure, the at least two magnets, and the at least two passageways; and a cap, where the cap includes a magnetic field shielding component configured to lock support structure within the magnetic shield.

\* \* \* \* \*